Dec. 20, 1949     J. A. SODERBERG     2,492,121
PINKING SHEARS
Filed Dec. 27, 1946
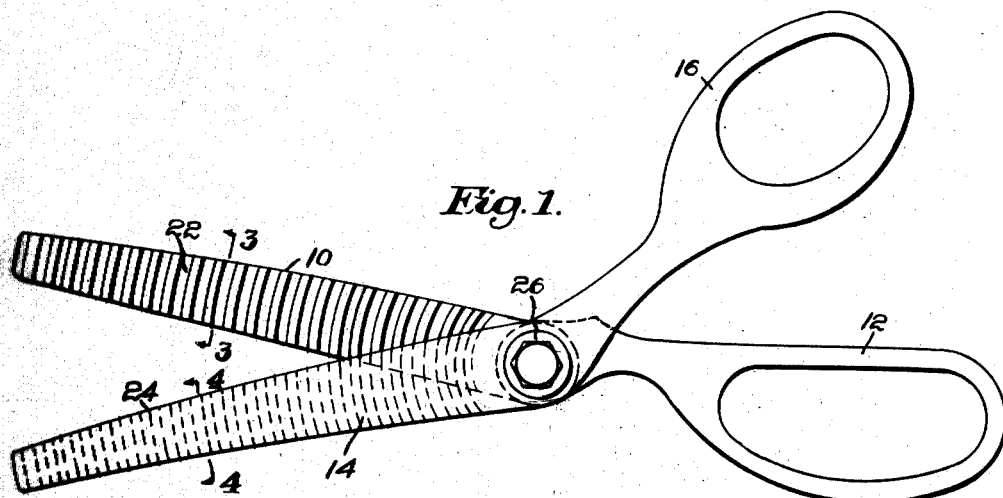
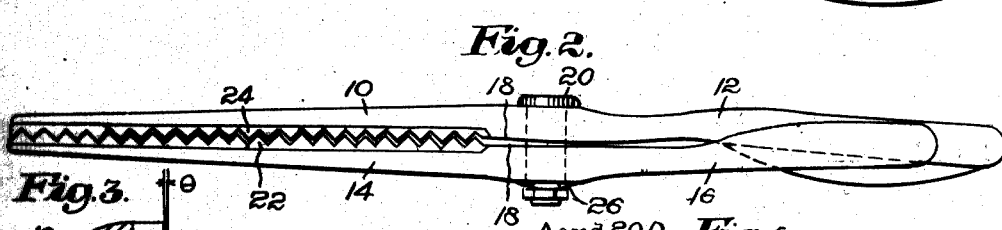
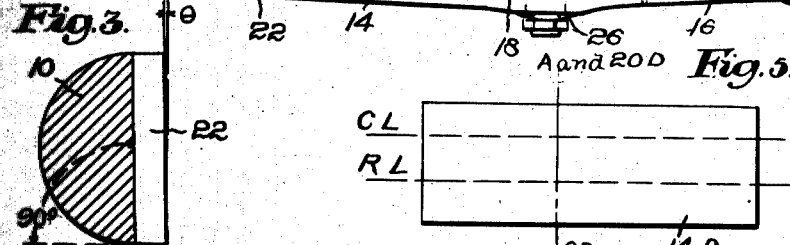
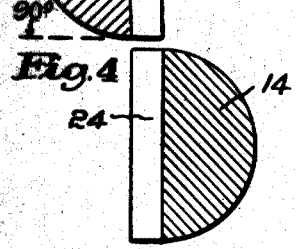
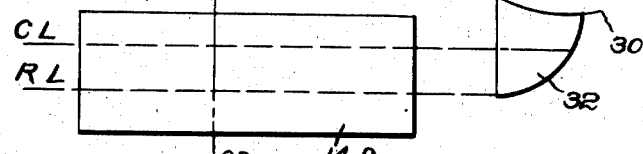
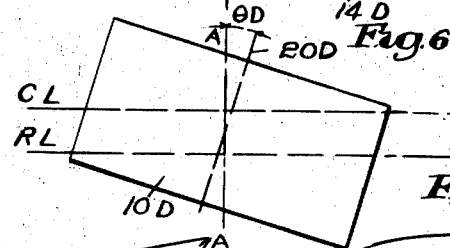
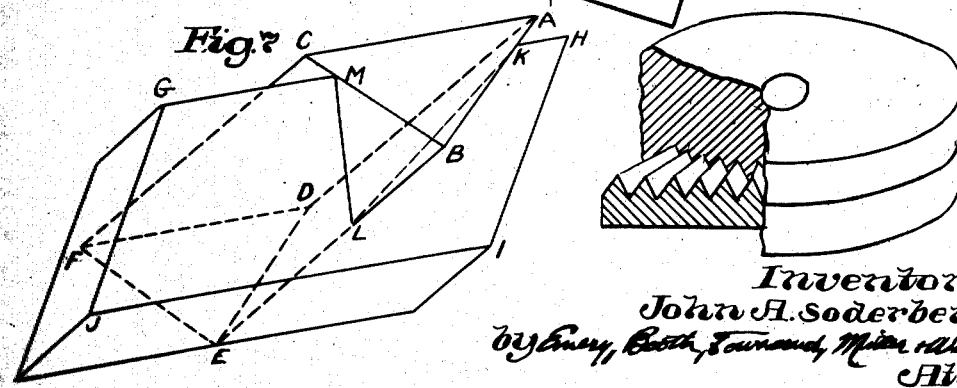
Inventor:
John A. Soderberg Patented Dec. 20, 1949

2,492,121

UNITED STATES PATENT OFFICE 2,492,121

PINKING SHEARS

John A. Soderberg, Worcester, Mass., assignor to Parker Manufacturing Company, Worcester, Mass., a corporation of Massachusetts Application December 27, 1946, Serial No. 718,847

1 Claim. (Cl. 30—230)

This invention relates to pinking shears which are hand tools of the scissors kind, and in particular to that type wherein a pair of cooperating blades are provided along their opposed faces with teeth, those of one blade meshing with those of the other, the edges of the end surfaces of the teeth which are disposed along the faces of the blades cooperating as cutting edges to make a zigzag or undulated cut when the blades are operated. The object of the invention is to provide a construction of tool easily and accurately made, wieldy to use and efficient in its cutting operation.

The invention will be well understood by reference to the following description of the illustrative embodiment thereof illustrated in the accompanying drawings and expounded in connection with various diagrams forming a part of the drawings. In the drawings—

Fig. 1 is a side elevation of the shears with the blades open;

Fig. 2 is a top plan view thereof with the blades closed;

Figs. 3 and 4 are enlarged sections on the lines 3—3 and 4—4 of Fig. 1 respectively;

Figs. 5 and 6 are diagrams illustrating a suitable method of forming the teeth; and Figs. 7 and 8 are diagrams to be referred to.

In the following description in referring to the blades of the shears I shall term "inner surfaces" those which are opposed to each other when the shears are closed, Fig. 1 showing the inner surface of the further blade and the outer surface of the nearer blade. By "backs" I refer to those portions of the levers corresponding in location to the back of ordinary shear blades and by "upper faces" to the parts opposite to the backs and corresponding in location to the bevelled cutting edge of ordinary shear blades. Thus Fig. 2 shows the back of the blade 10 and the face of the nether blade 14. I shall also use in describing the teeth the nomenclature usually applied to screws threads.

When pinking shears are formed as described in the patent to Austin 484,406, January 3, 1893, with teeth concentric to the pivotal axis and of such cross section and relative disposition that the flanks of the teeth fit throughout their entire opposed surfaces as the blades move across one another, efficient cutting may be effected. The work, however, is very hard and the shears are heavy and therefore they are not a desirable or even practicable hand tool. It has heretofore been proposed to reduce the height or depth of the teeth relative to the width of the blade by forming them in a relatively thin flange. Obviously the reduction in length thus effected is severely limited by considerations of strength and durability. It has also been proposed to buttress such a flange by a fillet or cantilever at the under side or to form relatively shallow teeth similarly buttressed individually. Since it is the edges forming the boundaries of the plane figure forming the base of the tooth exposed at the face of the blade which are the actual cutting edges, it is theoretically possible to shape each and all of the teeth to provide a clearance from these edges, but I am not aware that it has been found possible to produce in this manner a tool satisfactory for practical use.

Referring now to Fig. 1, the shears shown comprise an upper blade 10 having a finger bow 12 and a nether blade 14 having a thumb bow 16. The blades are provided with bearing surfaces 18 (see Fig. 2) transversed by a pivot bolt 20 perpendicular to those surfaces. Teeth 22 and 24 respectively are formed on the inner surfaces of the blades 10 and 14, the teeth being of a form hereinafter to be more fully described. The teeth are curved concentrically to pivot axis 20 and those of one blade are opposite the spaces between those of the other. The longitudinal planes through the crests and roots of the teeth (see Fig. 2) may converge slightly, half a degree is sufficient, outwardly from the bearing surfaces 18 toward the ends of the blades to obtain the effect of toe-in or camber usual in ordinary scissors, this action being permitted by a spring washer 26 tending to press the bearing surfaces together but permitting them to move apart slightly as the distal portions of the blades move into cooperation one with another. In the following description and in the claim I shall for simplicity ignore this angular position of the lines of teeth and describe the parts as if the crests and roots were along planes at right angles to the axis 20.

The teeth 24 and 22 here shown have generally a cross section which is an isosceles triangle. The teeth 24 of the nether blade 14 are "straight" or "without clearance" and may be described, somewhat prolixly because no simple accurate words of general use are available, as corresponding to short segments of solids of revolution such as would be generated by the revolution of an isosceles triangle about an axis parallel to its altitude and coinciding with the pivot 20 of the blades. It may be helpful to an understanding of the form of the teeth to ignore the curvature and to consider that the form of teeth 24 is essentially that of a right triangular prism disposed parallel to the plane between the opposed faces of the blades. As will appear, however, reference to a right prism does not necessarily imply that the bases are parallel or necessarily at right angles to the edges of the prism.

On the other hand, the teeth 22 of the upper blade 10 are "inclined" or "with clearance" and they may be defined as corresponding to short segments of solids of revolution such as would be generated by the revolution of an isosceles triangle, equal to the one referred to in defining the teeth 24 of the nether blade, about an axis parallel to its altitude but inclined relatively to the pivotal axis 20 of the blade. The angle of inclination is necessarily slight and a half of one degree is effective. Ignoring the curvature, we might consider the form of these teeth 22 as being that of an oblique triangular prism the axis of which is at an angle to the plane between the opposed faces of the two blades and which has a base exposed at the face of the blade.

In operation the plane angle of the base of tooth 22 at the face of the blade (which forms its cutting edge) fits the plane angle between two cooperating teeth 24 at the face of the nether blade (which are part of their cutting edges). As the shears are operated, the plane angle of tooth 22 moves in contact with the flanks of those teeth 24, fitting the dihedral angle between them except as moved apart because of the camber of the blades as above referred to. The body of the tooth 22 toward the back of the blade, however, has clearance from the sides of this dihedral angle formed by the flanks of teeth 24.

The form of the teeth may be more fully understood by reference to Figs. 5 and 6 representing in diagrammatic form a suitable manufacturing process by which the shears may be formed. In these diagrams I have marked certain parts corresponding to those shown in Figs. 1 to 4 with the same reference numerals to which is added the letter D to indicate their theoretical correspondence while emphasizing that what appears in the diagram is entirely unrealistic.

Referring to Fig. 5, there is there seen a blank 14D corresponding to the nether blade. The point of view is as if we were looking along the length of the blank and its cross section has for simplicity been here shown as a simple rectangle. It is disposed in the path of a suitable rotary milling cutter 30, the axis of which and the axis of the blank 14D being disposed radially to a pivotal center A, herein coinciding with the pivotal axis 20D of the blade. The milling cutter has teeth 32 of such number and form as to cut grooves the cross sections of which in planes perpendicular to their root lines corresponding to the spaces between the teeth 24 and define between them projections, the cross sections of which in planes parallel to their crest lines are the same. The ends of the milling teeth 32 move tangent to a root line RL and the blank and the tool as a whole are moved relatively about the central axis A so that the lines RL along which the crests of the several teeth 32 travel are circles concentric with the center A and in this instance with the pivotal axis 20D of the blade. Ignoring curvature, the action is as if the tooth shown in Fig. 5 were advanced rectilinearly in the plane of the paper toward the left in that figure, plowing out from the blank teeth having root lines RL and crest lines CL. If it were possible for the tooth to plow its way through steel in this manner by simply moving with its point always in the circle RL, the spaces between the several teeth 32 on the tool would be isosceles triangles generating solids of revolution of which the teeth cut in the blank would be short segments.

In Fig. 6 the blank 10D is shown with the pivotal axis 20D for the blade tilted at an angle $\theta D$ to the axis A. The angle is enormously exaggerated in the diagram. The milling tool, operated as before about the axis A, cuts along the root lines and crest lines RL and CL to form teeth. Now, when these teeth have been formed, if the blank is swung back to cause the axes A and 20D to coincide, the flanks of the teeth will incline from the face of the blade (at the right in Fig. 6) outwardly away from the inner surface and the teeth (ignoring curvature) will have the aspect of an oblique prism (see Fig. 3) as we view them with the scissors in the ordinary vertical position, the plane between the two blades being a vertical plane.

I refer now to Figs. 3 and 4 which are relatively positioned to show the cooperation of the teeth. The reader must consider the sectioning "plane" (it is really a cylindrical surface centered on 20) of Fig. 3 nearer to him by one-half the width of a tooth than the sectioning plane of Fig. 4. The triangle formed by tooth 22 at the face of blade 10 fits between the flanks of teeth 24 but the flanks of teeth 22 as the vertex of the triangle moves along the roots of the teeth 24 will have clearance from those flanks and the root and crest lines of teeth 22 will have clearance respectively from the crest and root lines of teeth 24. The clearance angle is $\theta$ and corresponds to the angle $\theta D$ in the diagram Fig. 6. This angle $\theta$ must be small. I have found one-half of a degree sufficient.

In Fig. 7 I have shown diagrammatically an isosceles triangular prism ABCDEF intersecting a block, the nearer face GHIJ of the latter being shown at an angle to the side BE of the prism. This may be considered as a diagram of a cutting tooth or of a tooth like tooth 24 plowing its way through a block. The plane angle KLM is equal to the angle ABC of the prism if the angle BLM is a right angle. Otherwise it is smaller by an amount depending on the magnitude of angle BLM. Now, the dihedral angle of teeth 22 measured in a plane perpendicular to their crest line is identical with that of teeth 24 cut by the same cutter 32. The plane angle between the cutting edges of teeth 22 at the face of the blade (corresponding to KLM) will generally be different but will fit the flanks of tooth 24 when the dihedral angles are coincident as in the diagram Fig. 7. When, however, we tilt the blade to bring its axis 20D back into coincidence with the axis A and with the axis of the nether blade 14, we are moving the plane angle between the edges of teeth 22 at the face of the blade to a different position angularly along the flanks and it no longer fits. It is as if we swung the angle KLM in Fig. 7 back toward the vertical and obviously this could not be done if the parts shown in Fig. 7 were rigid physical elements because the angle KLM increases as we approach the vertical. Therefore, theoretically, the cutting edges of teeth cut in the manner illustrated in Fig. 6 where the cutter 32 is identical with the cutter used in Fig. 5 will be smaller in angular measure than the dihedral angle between two teeth 24 cut by the same cutter. However, when the angle $\theta$ is small, as herein explained, the difference is negligible, far less than any possible accuracy of manufacture and immaterial to the efficiency of the tool.

The magnitude of the angle KLM depends in part on the sine of the angle BLM and since the change in value of the sine function is least rapid in the vicinity of 90° I prefer to make the face of the blade having the teeth 22 at right angles to the path of the cutting tool either by so positioning the blank (not as diagrammed in Fig. 6) or by dressing off the toothed blank to that angle. I have so marked the angle in Fig. 3 to indicate the preferred construction. The angular measure of the plane angle of the edges is then the same as that of the dihedral angle. Given a clearance angle $\theta$ half a degree, the sine between 90° and 89½° varies by an amount equal to about two parts in one hundred thousand. The fit of the plane angle of the edges of teeth 22 to the flanks of teeth 24 is not perceptibly altered. A pronounced bevel of the face of the blade, even for the same small clearance angle, would increase the theoretical inaccuracy.

In Fig. 8 I have illustrated, partly broken away, two superposed discs having interfitting annular ridges. They can rotate freely, one on another, about a central point corresponding to the centers of the annuli. Now, if we cut a strip from such a pair of discs, the fit is not changed whatever the direction or form of the lines of cut by which the strip is dissected from the discs. This illustrates the fact that if we had two blades with straight teeth, as in Fig. 4, the fit of the teeth would not be altered whatever the shape of the faces of the blades although the sequence of the cut along the edges of the teeth exposed at the faces of the blades might be. On the other hand, if teeth 22 as shown fit teeth 24, if we cut away the face of the blade 10 and its teeth 22, we change the plane angle of the cutting edges of the teeth 22 or the lateral position of the cutting edges relatively to those of teeth 24, or both, and will destroy the fit. If the teeth 22 and 24 fit in the first instance, we do not destroy the fit by changing the angle or longitudinal contour of the face of blade 14.

In the shears shown the upper blade 10 is straight outwardly from the pivot and the plane angles defining the faces of teeth 22 are identical. The blade 14 is curved outwardly from the pivot in a plane perpendicular to the pivot. This does not destroy the fit for the reasons explained. This would not be true if blade 10 with its inclined teeth 22 or both blades were curved. However, the angle (in the plane of the paper viewing Fig. 1) at which the faces of the blades meet as the scissors are closed is such throughout the cut as to facilitate the cut and cause the shears to cut clearly to the distal ends of the blades.

If the shears are to be sharpened, the faces of the teeth 22 may be ground off and a suitable amount (in practice the identical amount) removed from the bearing surface 18 of the blade 10. The line of the face of the blade is straight and the blade may therefore be easily ground down without altering the plane angles of the face of the blade. On the other hand, the face of blade 14, at least in its distal portion, is curved. It may be ground down to sharpen it but it is not necessary to follow the curve or the angle of the face with close accuracy. Any departure will not destroy the fit between the teeth 22 and 24. No careful coordination of the grindings of the two separate blades is required.

In the case of triangular teeth as shown, a large vertex angle is desirable. I have used 100° with success. A triangle is a desirable form for the cross section of the tooth although other forms could be adopted. It will be understood that by describing the tooth form in the nomenclature usually applied to screw-threads I do not imply that there would be a clearance between the crests of the teeth of one blade and the roots of the teeth of the opposing blade as a shearing cut throughout the zigzag line is to be attained.

It is desirable that the cutting should proceed with a true shearing action as distinguished from a punch and die action, the cutting edges crossing one another progressively inwardly along one leg of the triangle, outwardly along the succeeding leg and so on throughout the row of teeth. The disposition of the faces of the blades substantially at right angles to the central plane which is perpendicular to the pivotal axis is favorable to the attainment of such a sequential cut.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claim to indicate those principles of the invention exemplified by the particular embodiment described and which I desire to secure by Letters Patent.

I claim:

Pinking shears of the kind comprising a pair of blades pivoted together and moving across one another in parallel planes and provided with teeth, those of one blade meshing with those of the other to provide a zigzag shearing line along the faces of the blades, said shears comprising a first blade the teeth of which correspond to short segments of solids of revolution such as would be generated by the revolution of a symmetrical plane figure about an axis parallel to its axis of symmetry and coinciding with the pivotal axis of the blade, and a second blade the teeth of which correspond to short segments of solids of revolution such as would be generated by revolution of the same figure about an axis parallel to its axis of symmetry and inclined relatively to the pivotal axis of the blade, the upper face of the former blade being curved outwardly from the pivot and the upper face of the latter blade being straight.

JOHN A. SODERBERG.

REFERENCES CITED

The following references are of record in the file of this patent:

UNITED STATES PATENTS

| Number | Name | Date |
| --- | --- | --- |
| 2,387,053 | Brown | Oct. 16, 1945 |
| 2,395,896 | Mitchel | Mar. 5, 1946 |
| 2,395,897 | Kethcart | Mar. 5, 1946 |